July 1, 1924.  1,499,763

K. DAVIS

POWER TRANSMITTING AND SPEED REDUCING MECHANISM

Filed April 15, 1922  5 Sheets-Sheet 1

INVENTOR
Kenneth Davis
BY John D. Morgan
ATTORNEY

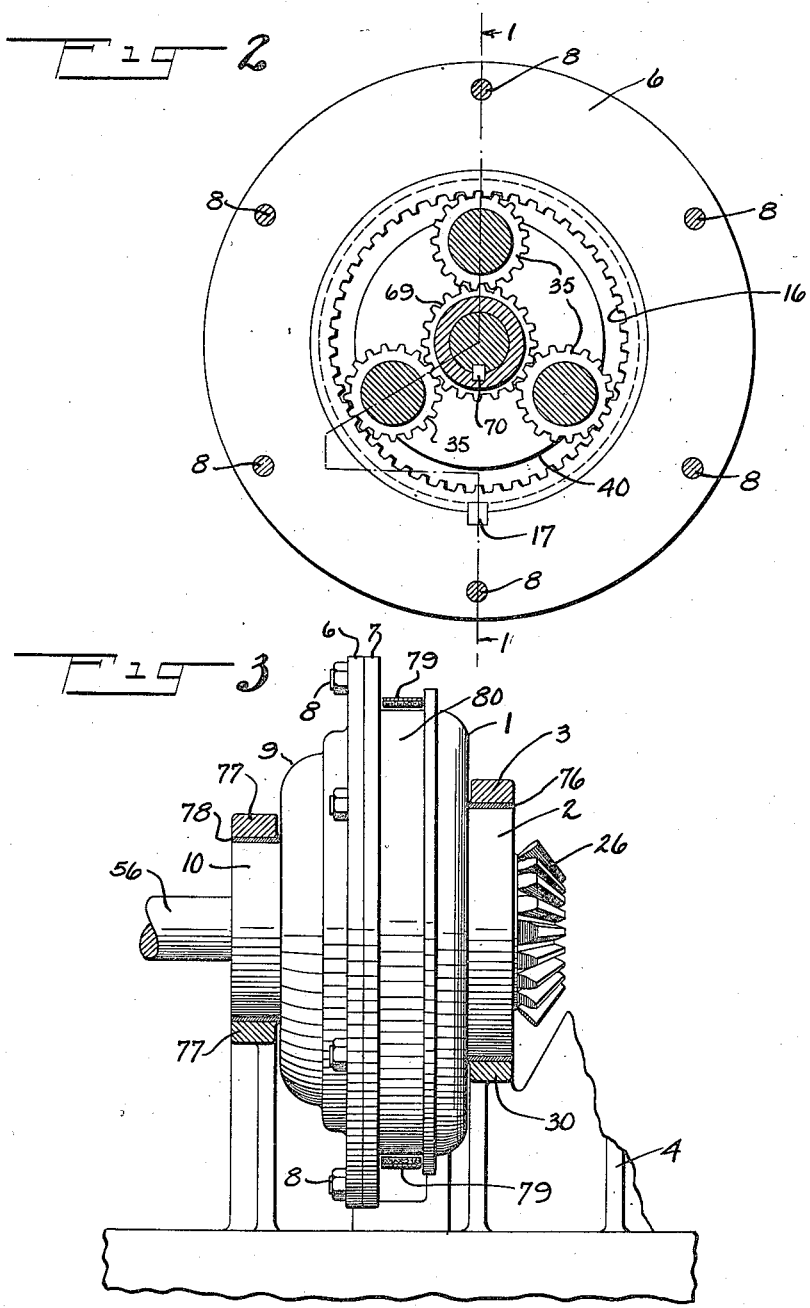

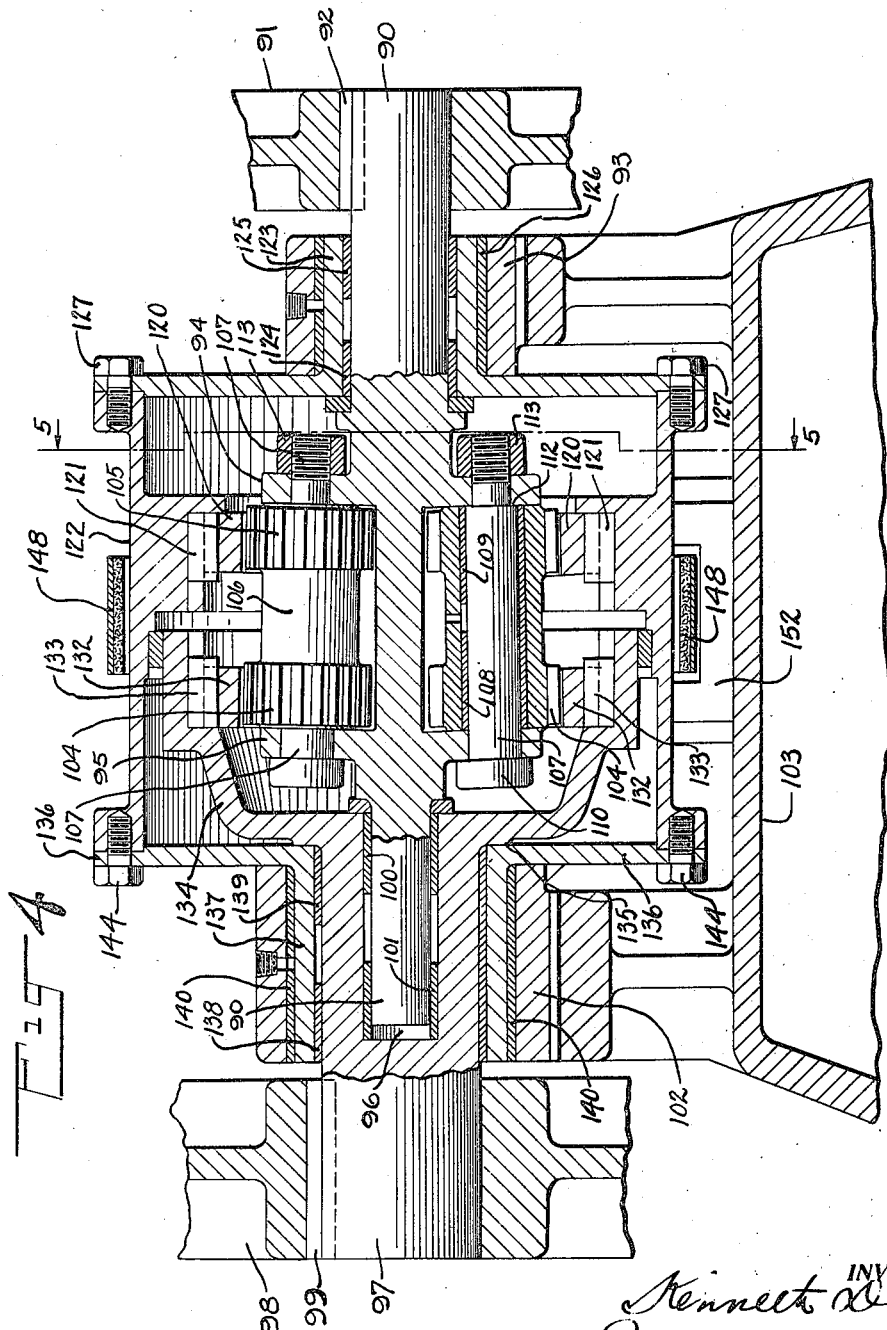

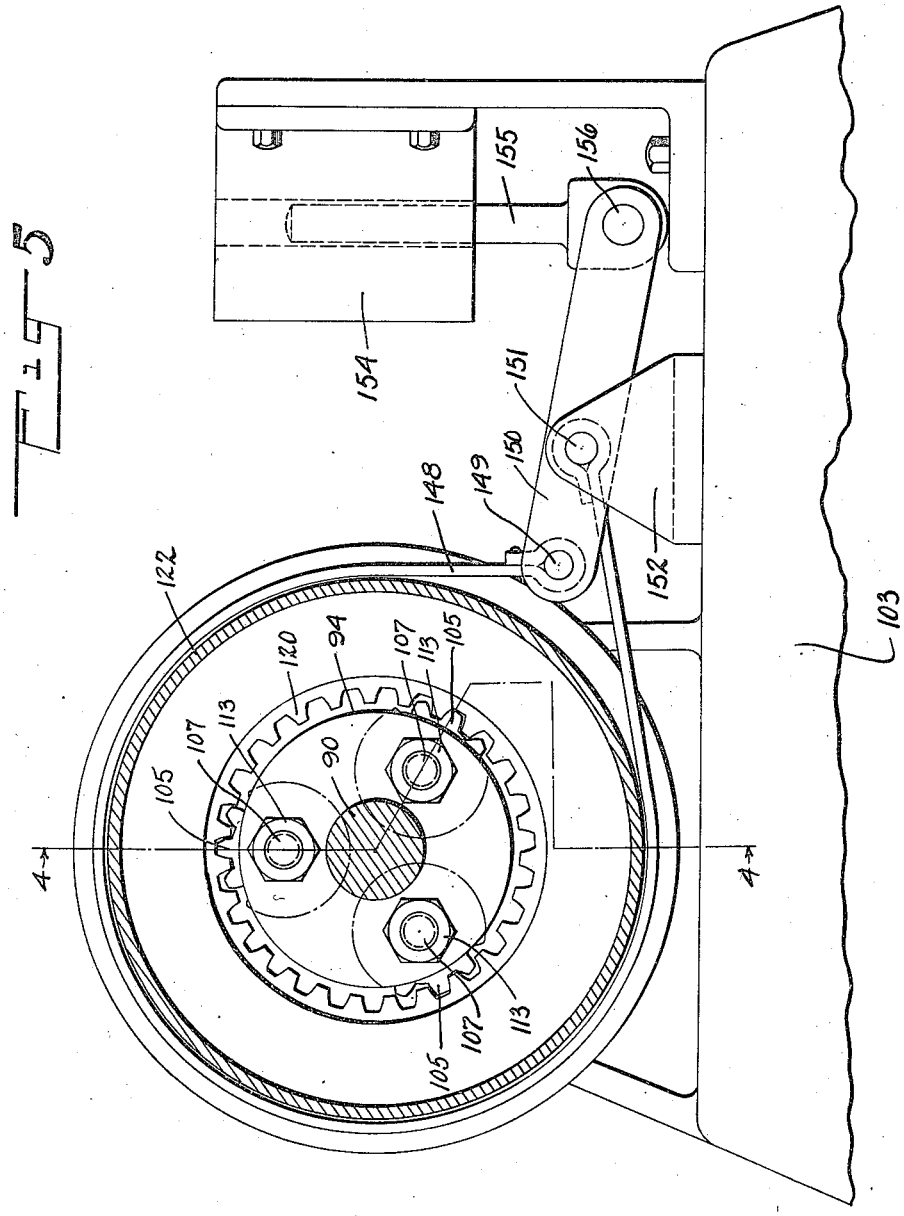

July 1, 1924.
K. DAVIS
1,499,763
POWER TRANSMITTING AND SPEED REDUCING MECHANISM
Filed April 15, 1922    5 Sheets-Sheet 5
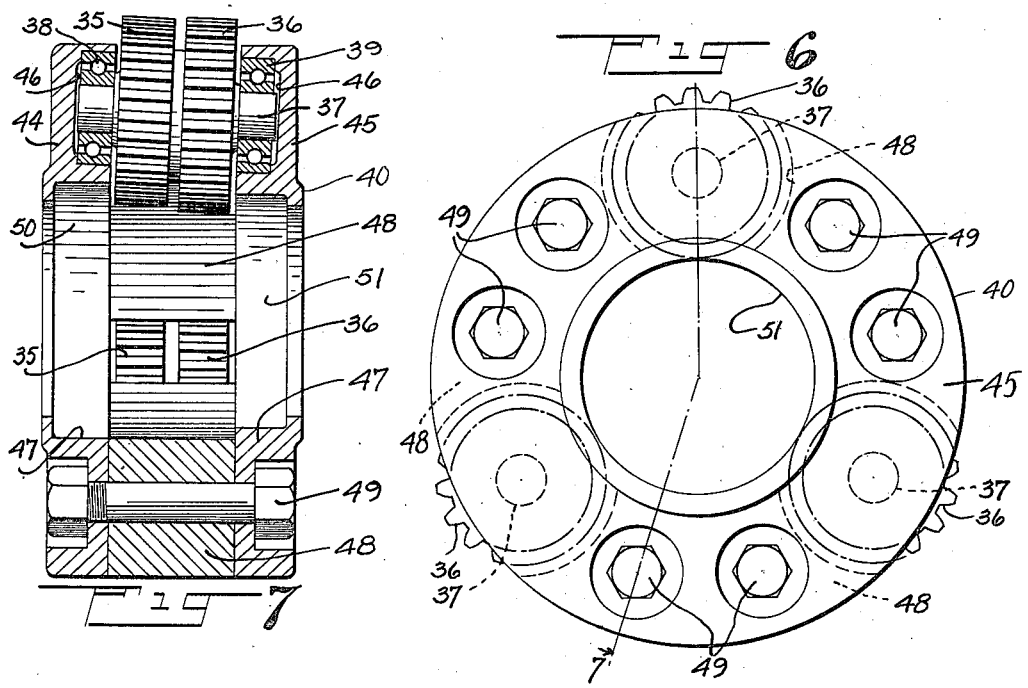
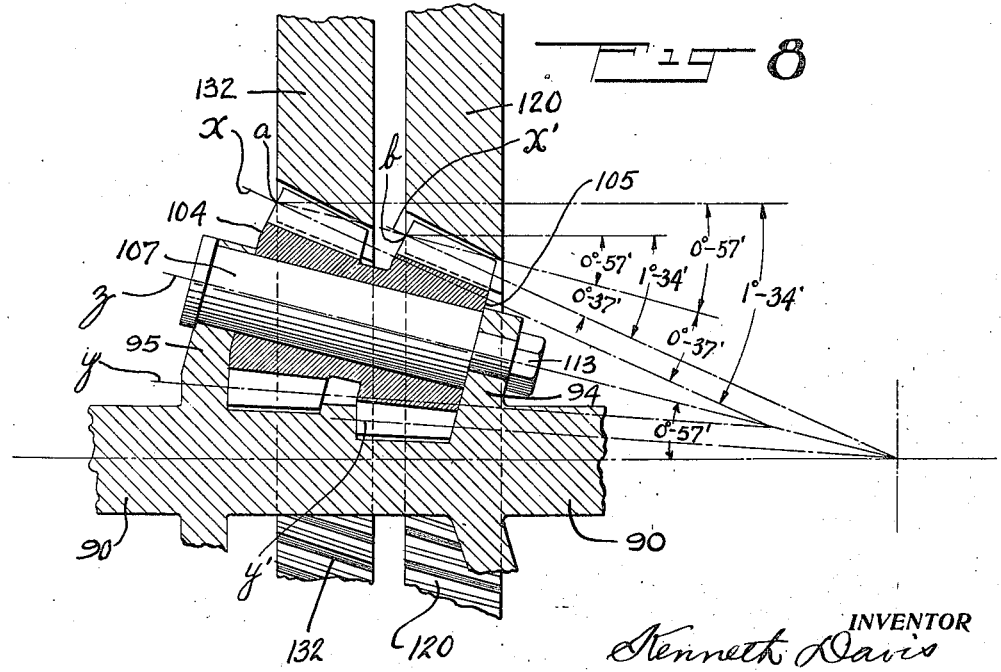
INVENTOR
Kenneth Davis
BY John D. Morgan
ATTORNEY Patented July 1, 1924.

1,499,763

UNITED STATES PATENT OFFICE.

KENNETH DAVIS, OF ST. BENEDICT, PENNSYLVANIA, ASSIGNOR TO REMBRANDT PEALE, OF ST. BENEDICT, PENNSYLVANIA.

POWER-TRANSMITTING AND SPEED-REDUCING MECHANISM.

Application filed April 15, 1922. Serial No. 553,251.

*To all whom it may concern:*

Be it known that I, KENNETH DAVIS, a citizen of the United States, residing at St. Benedict, in the county of Cambria and State of Pennsylvania, have made certain new and useful Improvements in Power-Transmitting and Speed-Reducing Mechanism, of which the following is a specification.

The invention relates to a new and useful power-transmitting and speed-reducing mechanism and more especially, in certain of its features, to such a mechanism especially capacitated for use as a direct drive between the relatively very rapidly rotating shaft of an electric motor and a relatively heavy and slow-moving load.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 2 is a vertical section on a reduced scale, taken substantially on the line 2—2 of Fig. 1;

Fig. 3 is an end elevation, looking at Fig. 1 from the front, or Fig. 2 from the right, with parts in section, and showing a brake control for the drive;

Fig. 4 is a vertical longitudinal section, showing a different or modified form of a gearing mechanism embodying the invention, taken substantially on the line 4—4 of Fig. 5;

Fig. 5 is a transverse vertical section, taken substantially on line 5—5 of Fig. 4, and showing a solenoid control for the brake band;

Fig. 6 is a side elevation of the carrier for the gear pinions shown in section in the central part of Fig. 1;

Fig. 7 is a section taken substantially on the line 7—7 of Fig. 6; and

Fig. 8 is a diagrammatic view, with proportions and angles very greatly exaggerated, for use in explaining certain principles of the invention.

Figure 1:
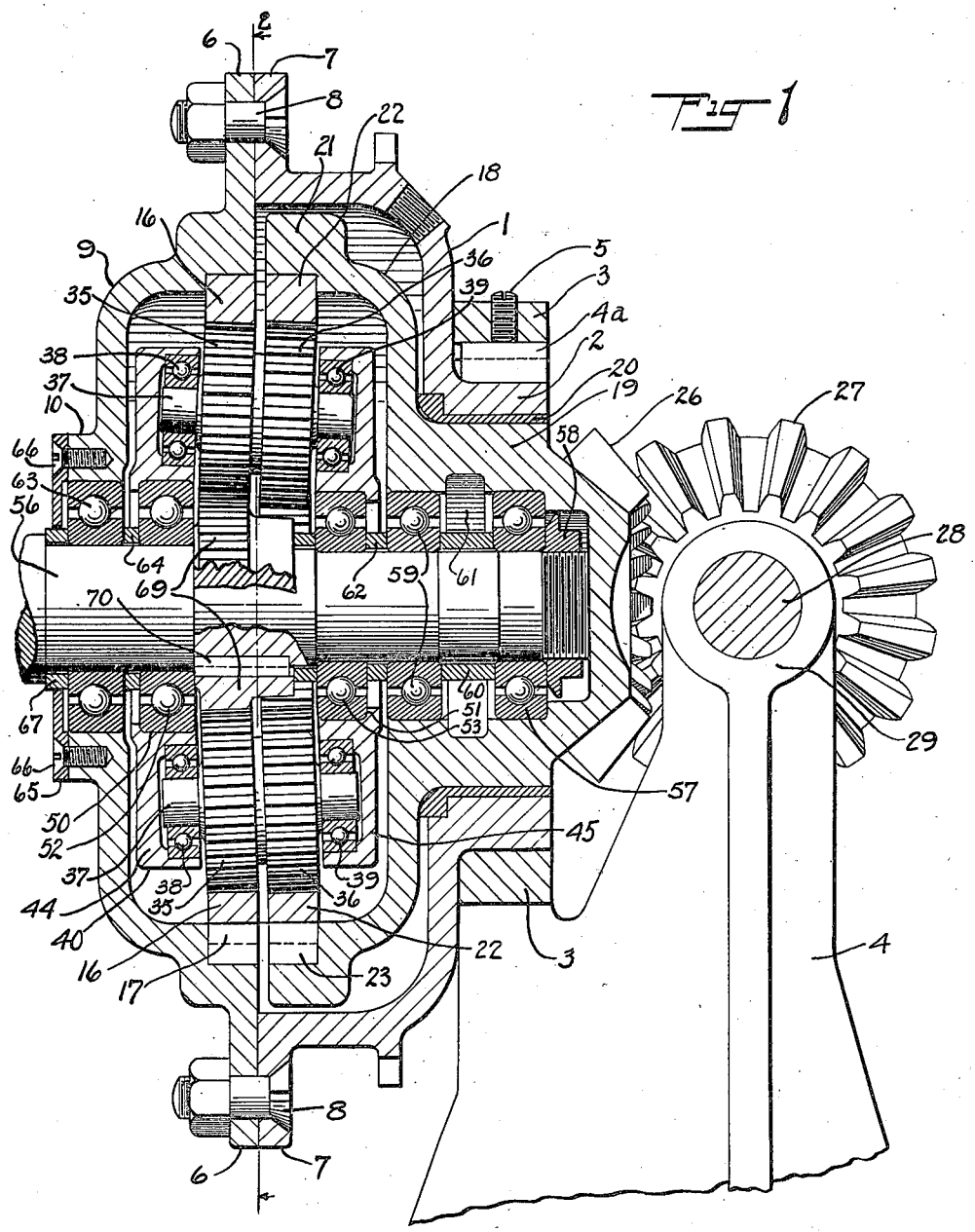
Fig. 1 is a vertical section through a mechanism embodying the invention, taken substantially on the line 1—1 of Fig. 2.

The herein illustrated exemplification and embodiment of the invention is shown in my copending application Ser. No. 574,613, filed July 13, 1922, applied in a machine for handling and transporting loose material, and as constituting a direct drive between the shaft of the electric motor and the shaft of the mechanism for operating a pusher blade which pushes the loose material out of the shovel or carrier of the material handling machine.

In the practical application of the invention just referred to, the power transmitting and speed reducing mechanism operates between the rapidly rotating motor shaft and the relatively very slowly moving, heavy-duty pusher blade of the shovel. It will be understood, of course, that this particular exemplary practical application of the invention is illustrative and not restrictive thereof.

The present invention provides a light weight, compact, sturdy and simple power transmitting and speed reducing mechanism, which affords an unusually great speed reduction between a very rapidly rotating driving shaft and a relatively very slow-moving and heavy load, and effects this without undue heating, wear or friction.

One of the principal features of the invention is the double pinions of the same pitch diameter intermeshing with internal gear rings, or equivalent members, of different pitch diameters. In connection with this feature to secure proper mesh and other coaction of the gears, the double pinions and the internal gears are beveled, and the axis of the pinions is at a definite degree of inclination to the axis of the internal gears as is hereinafter set forth in detail.

By my invention I secure a tremendous speed reduction in a very small space and with a very small relative weight of mechanism, concomitant with the ability to transmit a very large horsepower, and with the other advantages hereinbefore enumerated. In addition, with the mechanism of my invention, the pitch line velocity of the gears can be much lower for a given speed reduction than with other gears, which is likewise a great advantage where the speed reduction is great.

Other features and advantages of the invention will be primarily set forth in connection with the following detailed description of the invention, and it will be understood that the foregoing general description and also the following detailed description are explanatory and exemplary, and are not restrictive of the invention.

Referring now in detail to the embodiment of the invention illustrated by way of example in the accompanying drawings, and referring for the present more particularly to Figs. 1, 2 and 8, a housing 1 is provided having a hollow hub or cylindrical part 2, supported in a bearing 3, on a standard 4. The housing is held against rotation by a key or keys 4$^a$, engaging the hub 2 and the support 3, clamping screws 5 being provided to hold the keys in position. The housing is preferably in two parts, united by a pair of abutting flanges 6 and 7 fastened together by bolts 8. The other part 9 of the housing is also provided with a hub or cylindrical central part 10, the driven shaft being journaled in these two hubs or cylindrical parts, as later described.

This embodied form of the invention is that utilized in my application Ser. No. 574,613, as a direct drive and speed reduction between the motor shaft and the actuating shaft and arms for the pusher blade in the shovel, or container for the material, of the machine of my said application. It will be understood, of course, that the device is adaptable also to other uses.

In said embodied form, an internally geared ring 16 is supported in fixed relation to the stationary housing member 9, being held in suitable manner, as by keys 17.

Rotatably mounted in the hub or cylindrical portion 2 of the housing member 1 is a shell 18, having a hub or cylindrical part 19, rotatably fitting within the hub 2, preferably with an interposed bushing 20. Within the housing, the shell 18 is expanded into a general bowl shape, and has a reinforced or enlarged rim portion 21 to which is fixed an internally geared ring 22, by suitable means such as keys 23. The gear rings 16 and 22 are preferably of different pitch diameters and have different numbers of teeth.

In this form, the shell 18 is rotated within its bearing in the hub 2 of the housing, and for this purpose the hub 19 has fixed to, or integral with, its exterior end a beveled gear wheel 26. In mesh with gear 26 is a beveled gear wheel 27, fixed on the shaft 28 (which may be the driven shaft), this shaft being journaled in one or more bearings 29, carried upon the pillar or support 4 of the frame.

In this embodied form, three sets of pinions, or three double pinions, are provided in mesh respectively with the gear rings 16 and 22, the two pinions or the two series of gear teeth on the pinions being of the same pitch diameter. In this embodied form also, the series of double pinions are mounted on and rotate freely about a central shaft, there being a sun pinion fixed to the shaft and in mesh with one of the pinions of each of the double pinions, as will be later described in detail.

As embodied, a pinion 35 of a double pinion meshes with gear ring 16 and the other pinion 36 of the double pinion meshes with gear ring 22, these two pinions being either integral or fixed to each other to rotate together. The pinions are fixed on, or integral with a shaft 37, which shaft is journaled at its respective ends in ball bearings 38 and 39, carried in a cage or carrier 40, rotatable upon the central shaft. The foregoing description will apply to either and to all of the double pinions and their mounting.

The detailed construction of the pinions and their carriers will be seen from Figs. 1, 6 and 7. The cage for the various sets of pinions consists of two generally circular, centrally apertured, opposed members 44 and 45, having an internal series of circular recesses 46, properly spaced apart angularly to receive the ball races for the shafts 37 of the respective pinions. Interposed between these recesses are solid portions 47 centrally interposed between which are spacers or spacing blocks 48 of a thickness to make space for the pinions between the members 44 and 45. Bolts 49 pass through the members 44 and 45 and through the spacing blocks 48 to hold the members 44 and 45 together, and to hold the pinions in position while permitting them to rotate freely in their ball bearings.

The central apertured portions 50 and 51 are shaped and proportioned to receive ball bearings 52 and 53, respectively, (Figs. 1 and 7) for the driving shaft 56, the exterior or outside raceways of the bearings fitting into these shaped parts 50 and 51 of the side members of the case, and the inner raceways of these two ball bearings being fitted about the shaft 56. The cage is thus free to rotate with little or no friction on the driving shaft.

In this embodied form, the shaft 56 is the driven shaft, and at its inner end it has a ball bearing 57, with one raceway nested within the hub 19 of the shell 18. A nut 58 is screwthreaded on the end of the shaft to hold the shaft and the other raceway of the ball bearing in position.

Another ball bearing 59 is preferably provided between the hub 19 and the shaft 56, a spacing collar 60 being interposed between the two ball bearings with a lubricating cavity 61 thereabout. A spacing collar 62 is also shown between the ball bearings 53 and 59. The shaft 56 is also provided with a ball bearing 63 within the hub 10, which is part of the housing member 9, the shaft having an additional external bearing (not shown), and in this case the housing has thus its bearing on the shaft.

A spacing collar 64 is provided between the ball bearings 52 and 63. A flat ring 65 retains the bearing 63 in position, this ring being attached to the face of the hub 10 by suitable means such as screws 66. A collar 67 within the ring 65, of metal or packing, serves to retain the lubricant within the housing.

A sun pinion 69 is fixed on shaft 56 by suitable means, such as one or more keys 70, this pinion 69 meshing with the pinions 35 of the various double pinions. A spacing collar is shown between pinion 69 and ball bearing 53. It will be understood that any suitable load will be driven from the shaft 56, through pinions 26 and 27, with a very great speed reduction, without objectionable heat generation or friction, and that the entire mechanism is adapted so that a load may be taken which is very heavy and slow-moving as compared with the rapidly moving motor shaft 56, the shaft of the pusher blade actuating mechanism in my said co-pending application Serial Number 574,613, being an example.

In Fig. 3 a somewhat modified form of the precedingly described mechanism is shown. Therein the hub 2 is not keyed to its support, but is journaled in the bearing 3 with an interposed bushing 76. There is also preferably provided a bearing 77 for the hub 10, and therewith for the shaft 56, and a bushing 78 is interposed between the hub 10 and its bearing 77.

In this case, a brake-band 79 encircles the drum face 80 formed on the exterior of the housing member 1, and the drive is rendered discontinuous optionally by the use of the brake-band. This brake-band may be manually controlled, or may be controlled from a distance by suitable means, such as the solenoid control shown in Fig. 5, which will be later described, and which is adapted for use with the distant control for the mechanism as disclosed in my copending application Serial Number 445,701, filed Feb. 17, 1921.

In Figs. 4 and 5 a different form or modification of the mechanism is shown wherein the double pinions rotate with the driving shaft, at the same time rotating about their own axis. This form of mechanism will be found preferable for certain duties, one example thereof being the car-haul mechanism shown and described in the copending application of Meritt Hutton, Ser. No. 405,699, filed Aug. 24, 1920, it being understood that this particular use is illustrative and not restrictive of the invention.

In the embodied form of Figs. 4 and 5, the shaft 90 may be taken as the driving shaft, driven in any suitable manner, but is shown with a driving gear 91 fixed thereto by a key 92. The shaft 90 is journaled in a bearing 93 at the right-hand side of Fig. 4, with certain members of the mechanism interposed, which will be later described. Fixed to or integral with the shaft 90, so as to rotate therewith, is the cage or carrier for the double pinions, and as embodied, there are formed on the shaft 90 two radially-extending, circular plates 94 and 95, spaced apart to receive the pinions therebetween.

The opposite end of the shaft 90, as embodied, is journaled in a concentric cylindrical socket 96, formed in the inner end of a driven shaft 97. The power may be communicated from the driven shaft 97 in any suitable manner, but as shown herein, a gear wheel 98 is fixed to the shaft 97 by a key 99. A bushing 100, with an external thrust flange cooperating with a shouldered portion of the shaft 90, and also a bushing 101, is interposed between the inner end of the shaft 90 and its bearing in the shaft 97. The shaft 97 is journaled in a bearing 102 formed on a part of the machine frame 103, with certain members of the mechanism interposed as will be later described.

The double pinions are preferably three in number, and as embodied, two pinions or annular series of gear teeth 104 and 105, of the same pitch diameter are connected together by a central part 106, preferably integral with the pinions. The pinions are mounted for rotation upon corresponding shafts 107, with interposed bushings 108 and 109, with proper lubrication openings and spaces, the pinions longitudinally fitting between the plates or sides 94 and 95 of the cage.

The pinion shafts 107 are provided with a head 110, exteriorly to the plate 95, and also with a shoulder 112 fitting on the inside of the plate 94. A nut 113 is screw-threaded on the end of the shaft which projects outwardly from the exterior face of the plate 94. Pinion 105 meshes with an internal gear ring 120, fixed by suitable means, such as one or more keys 121, to a housing 122.

Housing 122 has a cylindrical hollow hub 123, encircling the shaft 90 within the bearing 93, with interposed bushings 124 and 125, designed for lubrication and thrust absorption, there also being an external bushing 126 between the hub 123 and the bearing 93. For convenience in construction and assembling, the cylindrical part and the end of the housing are bolted together by screw-bolts 127.

Meshing with the pinion 104 is an internal gear ring 132, fixed by suitable means, such as one or more keys 133, to a bowl or shell 134, which is integral with or fixed to the driven shaft 97, and located within the housing as will be best seen from Fig. 4. This shell 134 has a shoulder 135, bearing against the end plate 136 at the left-hand side of the housing, the end plate 136 having a hollow hub 137, encircling the shaft 97 within the bearing 112, with interposed bushings 138 and 139, and with external bushings 140 and 141 with suitable lubrication spaces and openings. Likewise for purposes of construction and assembling the central drum portion of the housing and the end plate 136 are bolted together by screw bolts 144.

The drive is started and stopped, when a discontinuous drive is desired, by suitable means, such as a brake-band 148 encircling the central drum portion 122 of the housing, the brake-band being pivotally connected at 149 to the end of an actuating lever 150. Lever 150 is pivoted at 151 upon a supporting bracket 152, mounted on the frame 103, the other end of the brake-band being fastened to the pivot 151 of the lever. As embodied in Fig. 5, a solenoid 154 has its core 155, pivotally connected at 156 to the lever 150, to provide a distant control, in some cases automatic, for the drive. Where a continuous drive is desired, the housing may be keyed with the bearing as shown in Fig. 1 and already described.

Referring now to diagrammatic Fig. 8, in connection with the foregoing figures, and having special regard to that feature of the invention wherein the two series of gear teeth on the double pinion are of the same pitch diameter, Fig. 8 shows the mechanically simpler form of the mechanism, similar to that of Fig. 4, that is without a sun pinion on the shaft.

The pinions 104 and 105 are shown with the same pitch diameter, indicated by the lines $x$ and $x'$ and $y$ and $y'$, the lines $x$ and $x'$ being parallel and the lines $y$ and $y'$ being parallel, and the pitch diameters of the two gears being therefore equal. The forming and positioning of the gearing on the bevel under these conditions gives a better mechanical fit and a smoother driving action. The shaft or axis 106 for the pinions is also set at an angle to the axis of the shaft 90, and the axis $z$ of shaft 106 is parallel to the line $a$—$b$ connecting the pitch line edges of the two gears, that is, two corresponding points in the pitch diameter circle of the two pinions.

It will be understood that in actual construction these relations may be varied from to some degree, and that the proportions in Fig. 8 are greatly exaggerated, but the utilization of the double pinion with both its sets of gears of the same pitch diameter, these gears meshing respectively with gear rings of different pitch diameters, permits a vastly greater ratio of speed reduction within a given space, with a given weight of metal, and with a given horsepower to be transmitted without undue heating and friction losses than is otherwise possible.

One set of practical angle and other values are marked on Fig. 8, but it will be clearly understood that these are illustrative but are in nowise restrictive of the invention.

By making the two pinions of the double pinion of the same pitch diameter but of different pitch a very much greater ratio of reduction is effected, as thereby the driving and driven gears can be selected of much more nearly the same pitch diameter consistent with the strength necessary to transmit the requisite horsepower.

By way of a practical example, and without limiting the invention, let a double pinion be taken with 4 inches pitch diameter, one pinion thereof of 5 diametral pitch, that is, having 20 teeth, and the other pinion thereof of 6 diametral pitch, that is, having 24 teeth. One of the cooperating internal gears is taken of 10.8 inches pitch diameter and 5 diametral pitch, that is having 54 teeth and the other cooperating internal gear ring is 10.833 inches pitch diameter and 6 diametral pitch, that is, having 65 teeth.

The difference in the pitch diameter of the two gear rings is 10.833—10.8=.033 inches. As the two pinions of the double pinion are of equal pitch diameter and pitch circles, the difference in the circumferential travel of the two internal gears will be 3.14159×.033=.10367 inches for each revolution of the double pinion around the axis of the driving shaft. Assuming the 10.8 inch pitch diameter gear to be stationary, the ratio of speed reduction would be $$\frac{3.14159 \times 10.8}{.1037} = \frac{327.18}{1}$$

The example taken is within the ordinary limits of machine design practice for ordinary heavy loads, say to 50 horsepower, and effects a reduction many times that effected by the usual reduction gearing.

The foregoing gives a speed reduction ratio which is proportional to $\pi$ (PD—PD') and leaves absolute freedom from particular ratios of numbers of gear teeth to each other, thus leaving entire freedom of design as to choice of pitch, pitch line velocity, strength of teeth and other elements of design which must be taken into account in the mechanical problem involved while effecting the remarkably high speed reduction ratio made possible by the present invention.

From all the foregoing it will be understood that a mechanism has been provided realizing the objects and advantages hereinbefore set forth, together with other objects and advantages, and that departures may be made from the exact mechanisms herein shown and described without departing from the principles of the invention and without sacrificing its chief advantages.

What I claim is:—

1. A gearing mechanism including in combination two pinions of the same pitch diameter but different diametral pitch and fixed to rotate together, and two gears varying very slightly in their pitch diameters and having the same diametral pitch as the two pinions, respectively, the gears and pinions of the same diametral pitch being in mesh with each other.

2. A gearing mechanism including in combination two pinions of the same pitch diameter but different diametral pitch and fixed to rotate together, and two gears varying very slightly in their pitch diameters and having the same diametral pitch as the two pinions, respectively, the gears and pinions of the same diametral pitch being in mesh with each other, the axis of the pinions being at an angle to the axis of the gears.

3. A gearing mechanism including in combination two beveled pinions of the same pitch diameter but different diametral pitch and fixed to rotate together, and two beveled gears varying very slightly in their pitch diameters and having the same diametral pitch as the two pinions, respectively, the gears and pinions of the same diametral pitch being in mesh with each other.

4. A gearing mechanism including in combination two beveled pinions of the same pitch diameter but different diametral pitch and fixed to rotate together, and two beveled gears varying very slightly in their pitch diameters and having the same diametral pitch as the two pinions, respectively, the gears and pinions of the same diametral pitch being in mesh with each other, the axis of the pinions being at an angle to the axis of the gears.

5. A gearing mechanism including in combination two concentric gears and two beveled pinions of the same pitch diameter but different diametral pitch, fixed to rotate together, and one pinion meshing with one gear and the other pinion meshing with the other gear, and having their axis at an angle to the axis of the two gears and substantially parallel to a line drawn through their corresponding pitch corners.

6. A gearing mechanism including in combination two pinions of the same pitch diameter but different diametral pitch and fixed to rotate together, and two gears varying very slightly in their pitch diameters and having the same diametral pitch as the two pinions, respectively, the gears and pinions of the same diametral pitch being in mesh with each other, the axis of the pinions being at an angle to the axis of the gears and substantially parallel to a line drawn through their corresponding pitch corners.

7. A gearing mechanism including in combination two concentric gears varying very slightly in pitch diameter and of different diametral pitch, and two pinions fixed to rotate together and of the same pitch diameter but of different diametral pitch, but corresponding in diametral pitch to the two gears, the pinions and gears of the same diametral pitch meshing together, the pinions having their axis substantially parallel to a line drawn through their corresponding pitch corners.

8. A gearing mechanism including in combination two concentric gears varying very slightly in pitch diameter and of different diametral pitch, and two pinions fixed to rotate together and of the same pitch diameter but of different diametral pitch, but corresponding in diametral pitch to the two gears, the pinions and gears of the same diametral pitch meshing together, the pinions having their axis at an angle to the axis of the two gears and substantially parallel to a line drawn through their corresponding pitch corners.

9. A gearing mechanism including in combination a hubbed housing held in fixed relation, an internal gear ring fixed within the housing, a shell concentric with and journaled in the housing hub, an internal gear ring fixed to the shell, a pinion fixed to the shell exteriorly to the housing hub, a shaft concentrically journaled within the shell and housing, and a double pinion the two members of which are of the same pitch diameter within the housing and meshing with both gear rings and revolving about the shaft axis.

10. A gearing mechanism including in combination a hubbed housing held in fixed relation, an internal gear ring fixed within the housing, a shell concentric with and journaled in the housing hub, an internal gear ring fixed to the shell, a pinion fixed to the shell exteriorly to the housing hub, a shaft concentrically journaled within the shell and housing, and a double pinion the two members of which are of the same pitch diameter within the housing and meshing with both gear rings and revolving about the shaft axis and freely with respect to the shaft.

11. A gearing mechanism including in combination a hubbed housing held in fixed relation, an internal gear ring fixed within the housing, a shell concentric with and journaled in the housing hub, an internal gear ring fixed to the shell, a pinion fixed to the shell exteriorly to the housing hub, a shaft concentrically journaled within the shell and housing, a double pinion the two members of which are of the same pitch diameter within the housing and meshing with both gear rings and revolving about the shaft axis and freely with respect to the shaft, and a pinion fixed on the shaft and meshing with the double pinion.

In testimony whereof, I have signed my name to this specification.

KENNETH DAVIS.